Figure 1:
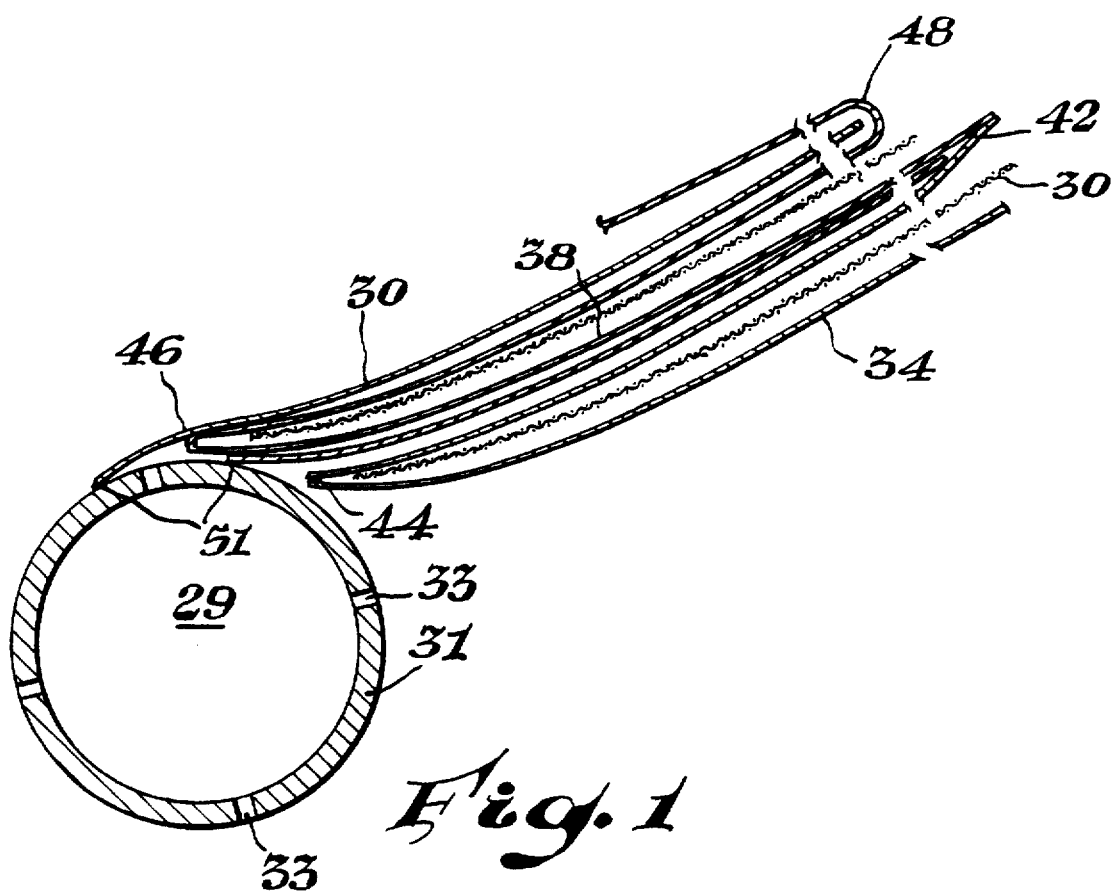

United States Patent [19]

Solie

[11] Patent Number: 5,538,642
[45] Date of Patent: Jul. 23, 1996

[54] SPIRAL WOUND MEMBRANE ELEMENT

[75] Inventor: Gregory D. Solie, Chaska, Minn.

[73] Assignee: The Dow Chemical Company, Midland, Mich.

[21] Appl. No.: 318,830

[22] PCT Filed: May 1, 1992

[86] PCT No.: PCT/US92/03650

§ 371 Date: Oct. 19, 1994

§ 102(e) Date: Oct. 19, 1994

[87] PCT Pub. No.: WO93/22038

PCT Pub. Date: Nov. 11, 1993

[51] Int. Cl.[6] ................................................. B01D 63/10
[52] U.S. Cl. ................................. 210/652; 210/321.83
[58] Field of Search ................... 96/8, 10, 11; 210/651,
210/652, 247, 321.74, 321.83, 450, 644, 650

[56] References Cited

U.S. PATENT DOCUMENTS

| | | | |
|---|---|---|---|
| 4,137,113 | 1/1979 | Kanamaru et al. | 156/187 |
| 4,765,893 | 8/1988 | Kohlheb | 210/315 |
| 4,802,982 | 2/1989 | Lien | 210/247 |
| 5,073,263 | 12/1991 | Fagundes et al. | 210/321.83 |

*Primary Examiner*—Frank Spear

[57] ABSTRACT

Spiral wound membrane elements have permeate flow channels attached to a porous polymeric mandrel in a regular and closely spaced array. The permeate flow channels are attached to the mandrel by means of ultrasonic welding. The attaching means permits the attachment of a high density of permeate flow channels.

11 Claims, 1 Drawing Sheet

SPIRAL WOUND MEMBRANE ELEMENT

The present invention relates generally to spirally wound membrane devices useful for separation of components of fluid feed streams by means known as ultrafiltration, microfiltration, nanofiltration, reverse osmosis, and separations of gas mixtures.

Simple, single leaf spirally wound membrane devices have been known for some time. For example, British Patent 489,654 (Sep. 1, 1938) describes a countercurrent spiral membrane device containing a cellulosic membrane material used for dialyzing caustic soda lye. As discussed therein, with such a design it is possible to fit considerable effective surface area of dialyzing membrane into an extraordinarily small volume, for example, a cylindrical container. Similar single leaf spiral membrane devices are broadly used today in a variety of applications. The advent of reverse osmosis desalination of saline waters in the early 1960's led to a number of improvements in spiral membrane devices, especially in terms of size. U.S. Pat. No. 3,417,870 describes a means of spirally winding a plurality of reverse osmosis membrane sheets and spacer materials around a perforated hollow core in a manner so as to provide large diameter spiral devices. The design illustrated and described in U.S. Pat. No. 3,417,870 has since been commonly applied to reverse osmosis, ultrafiltration, gas separations, and other types of membrane applications. The membrane element comprises a plurality of membrane leaves. A permeate flow channel is affixed to and surrounds a porous central mandrel. Membrane leaves comprise semi-permeable membrane sheet folded so as to enclose the feed flow channel on the major surfaces separated by permeate fluid flow channel sheets. The permeate flow channel sheets are placed between folded major surfaces of semi-permeable membrane. The membrane leaves of permeate flow channel, semi-permeable membrane and feed fluid flow channel are then wrapped about the central mandrel. The permeate flow channel is sealed along the axial edges and radially distal edge to prevent permeate fluid communication with feed fluid. The feed fluid flow channel sheets are open at the axial ends to feed fluid flow axially through the spiral winding adjacent to the semi-permeable membrane.

U.S. Pat. No. 4,235,723 describes an alternate method of assembling spiral membrane devices, in which a flow guide member is attached to a perforated hollow core, and a parallel array of membrane envelopes are attached together in a manner such that the permeate from each membrane envelope empties into the flow guide member. Such an arrangement has been termed a "tributary design," since a series of tributaries feed into a main stream, that is, the flow guide member, which empties into the hollow core.

More recently, a number of patents have appeared which incorporate improved materials and modified flow paths in single and multiple leaf spiral elements. U.S. Pat. No. 4,834,881 discloses a variety of improved corrugated spacers for use in feed fluid channels. U.S. Pat. Nos. 4,8612,487 and 4,902,417 describe improved channel spacers consisting of ribbed plastic nettings. A similarly ribbed plastic screen useful as a permeate channel flow spacer is described in U.S. Pat. No. 4,476,022. Flow channel spacers in the context of spiral wound membrane elements are occasionally described as two-dimensional articles, when the context permits. However, it is essential that the flow channel spacer have a thickness and open volume for the movement of fluid between membrane layers.

U.S. Pat. No. 3,386,583 to Merten describes an axially fed membrane element having a continuous membrane. Also taught is a continuous permeate fluid channel sheet, and a continuous feed fluid channel sheet. Manufacture of this design is cumbersome as it requires a complicated jig and the insertion of a position maintainer at the radially proximal end of each membrane envelope fold and a similar position maintainer at the radially distal end of each fold. During manufacture, the position maintainer must be inserted in the jig for each fold the axial length of the membrane element. No means of affixing the permeate channel sheet to the porous central mandrel is provided. Consequently, if the individual leaves are not constricted at all times, particularly when the position maintainers are withdrawn, the membrane leaves are free to change position resulting in a membrane element having non-uniform dimensions, i.e., not round but oval in cross-section and having the mandrel not centrally located within the cross-section.

While the forgoing spiral designs contributed to the separations art by concentrating a relatively large semi-permeable membrane surface area in a comparatively small volume, each embodiment required substantial care and manual manipulation to fabricate. An effort to simplify membrane element construction so as to identify a design which would lend itself to fabrication by machine is taught in U.S. Pat. No. 4,137,113. A membrane element comprising a continuous membrane sheet is among the designs taught. It is further taught to adhere at least one permeate fluid flow channel to the mandrel to facilitate winding the permeate fluid spacing layer, membrane, and feed fluid spacing layer about the membrane. U.S. Pat. Nos. 3,417,870 and 4,137,113 disclose gluing or adhesives as the method of fixing the permeate fluid channel to the mandrel.

Adhering the permeate fluid channel to the mandrel by means of glue requires that the permeate fluid channel be properly positioned on the mandrel and that the proper position be maintained without change for instance by a clamping means, until the glue has sufficiently hardened, or set, to permit handling the mandrel and attached sheets before removing the clamping means. The glue suggested by U.S. Pat. No. 4,137,113 is liquid epoxy or urethane. For these bonding agents, the hardening time necessary before the clamping means may be removed may vary from several minutes to several hours. In addition, the attachment of several permeate fluid channel sheets to the mandrel is cumbersome and time consuming. Either a clamping mechanism must be used to maintain the position of several permeate fluid channel sheets while the glue hardens, or the attaching process must be repeated after previously attached fluid channel sheets have been sufficiently hardened.

U.S. Pat. No. 3,872,014 discloses pressure sensitive tape as a means to secure the permeate channel to the mandrel. Manufacturing problems identified by the use of a liquid glue attaching means may be alleviated by use of a tape having a pressure sensitive adhesive attached to one or to both sides. Pressure sensitive adhesives have less bonding strength than the same contact area of epoxy or polyurethane glue. A greater mandrel surface area may be required to secure a permeate flow channel to a mandrel with pressure sensitive tape, or directly with pressure sensitive adhesive, than would be required to secure a permeate flow channel to a mandrel surface with liquid glue. In addition, the pressure sensitive adhesive must be considered as contacting the permeate fluid. In instances where the permeate fluid is water intended for drinking or other fluid for human consumption, satisfactory evidence may be necessary that the pressure sensitive adhesive did not present a health risk.

The attachment of the permeate flow channels to the mandrel occurs in the region where the mandrel is perforated, or porous to permit passage of the permeate into the central bore of the mandrel. The use of liquid glue, adhesives, and pressure sensitive adhesive tape will tend to occlude the necessary porosity to permit permeate to enter the central bore of the hollow mandrel. This tendency of liquid glue, pressure sensitive adhesives, and pressure sensitive adhesive tape to occlude the pores of the hollow mandrel is aggravated by increasing numbers of permeate flow channels attached to the mandrel.

Typical mandrels employed in spiral wound membrane elements have an external diameter of from 12 mm (½ inch) to 50 mm (2 inches). The circumference of a mandrel of a size customarily used in semipermeable membrane elements is insufficient for more than four, perhaps as many as eight attachments by glue or by pressure sensitive adhesive tape of permeate fluid channel sheets.

Permeate fluid channel spacers widely used consist of knit fabric, frequently tricot. The knit is of an open weave to promote high fluid flow. The flexible fabric is impregnated with a thermoset resin such as epoxy which is subsequently cross-linked to give the fabric rigidity and resistance to creep under pressure of the trans-membrane driving force, yet the fabric remains flexible and may be spirally wound with the other leaf components to form a membrane element.

It is significant that the permeate fluid channel sheets be attached to, and regularly spaced about, the circumference of the mandrel. Regularly spaced permeate fluid channel sheets facilitates the subsequent accurate placement of the remaining components of a membrane leaf: the flat sheet membrane and feed fluid flow channel. During assembly, the position of these remaining components may be preserved by gripping the membrane leaf components or by clamping the components, including the permeate fluid channel sheets, so as to prevent the membrane leaves from changing position relative to one another about the mandrel. By maintaining regular spacing about the circumference of each membrane leaf, a high degree of roundness of the spirally wound membrane element is preserved.

Roundness is important in order to fit the maximum surface area membrane element within a pressure vessel to form a membrane module. The tributary design described by U.S. Pat. No. 4,235,723 which comprises a series of tributary membrane permeate channels feed into a common fluid flow member is particularly susceptible to "out of round" shape when the membrane leaves are wound about the mandrel. If the element is out of round, areas of stagnant feed flow between the membrane element and the internal wall of the pressure vessel may result. Further, the fitting of pressure tight end caps on the pressure vessel having a bore for the passage of the mandrel therethrough is complicated when the mandrel is not centrally located within the spiral winding. If a manufacturing process produces membrane elements out of round, elements having less than the maximum possible surface area will be required in order to insert the membrane element in a given size pressure vessel.

Roundness may be achieved by attaching at regular intervals as few as four or six membrane leaves of uniform composition and length to the mandrel as by means of a glue adhesive or tape according to U.S Pat. Nos. 3,872,014 and 3,417,870. It is noted that the longer the spiral length of fluid flow in a membrane module, the greater the pressure loss of the fluid. Back pressure may develop in the permeate fluid channel sufficient to limit the capacity of the membrane element to pass permeate to the hollow mandrel bore. This pressure loss may be reduced for a given membrane module surface area by incorporating a larger number of membranes leaves having a shorter radial length.

Construction of a membrane element is completed by tightly winding the membrane leaves about the mandrel. The membrane leaves are frequently protected from damage by applying a protective outer layer such as a winding of continuous glass fibers and a hardening resin such as epoxy about the circumference of the membrane element. Advantageously the membrane leaves may be held in place and the tight winding of the membrane leaves preserved during application of a winding of continuous glass fibers and a hardening resin by first applying a winding of pressure sensitive adhesive film around the circumference of the element. The completed element thus has the general geometric shape of a cylinder.

It would also be advantageous to provide a means of assuring membrane element roundness and provide a sufficient number of membrane leaves so as to not limit by permeate fluid channel back pressure the capacity to pass permeate fluid.

It would be advantageous to provide a means of attaching permeate fluid channel sheet to a customarily sized polymeric mandrel of a semi-permeable membrane element so as to permit attachment of permeate fluid channel sheets at regularly spaced intervals about the circumference of the mandrel in a manner which does not place permeate fluid in contact with adhesive materials that have not been satisfactorily tested for toxicity.

It would be advantageous to provide a means of attaching permeate fluid channel sheet to a customarily sized polymeric mandrel without occluding the passage of permeate through the porosities of the mandrel into the central bore of the mandrel.

It would be advantageous to provide a means of attaching permeate fluid channel sheet to a customarily sized polymeric mandrel at a rate equal to and greater than 0.7 membrane leaves per centimeter of mandrel circumference.

These and other advantages are provided by the membrane element disclosed hereby.

FIG. 1 represents a single membrane leaf and attachment to a porous hollow mandrel.

The present invention comprises a spirally wound membrane module having a plurality of membrane leaves. FIG. 1 illustrates one of a plurality of membrane leaves of a spiral wound membrane element according to the invention. Each membrane leaf comprises at least one feed fluid channel sheet 30, a membrane sheet 34, and at least one permeate fluid channel 38. The permeate fluid channel is attached 51 to the thermoplastic hollow core mandrel 31. The hollow core mandrel rendered porous by boring holes 33 therein which permit fluid communication between the hollow bore 29 and the permeate fluid spacer 38. A membrane leaf includes in addition to the permeate fluid spacer, 38 a membrane 34 which by sealing means is formed into an envelope sealed at all surfaces and edges except adjacent to the porous mandrel.

In an embodiment of the invention, a plurality of discontinuous permeate channel spacer sheets are affixed to the hollow core mandrel. Each permeate channel spacer sheet is enclosed in an envelope as described with a semi-permeable membrane forming the major surfaces of the membrane envelope sealed at the axial edges and the radial distal and radial proximal edge to form the envelope enclosing the permeate fluid spacer.

In another embodiment, the invention comprises a spiral wound semi-permeable membrane element for axial feed fluid a porous hollow core a plurality of discontinuous permeate sheet spacer channels affixed to the hollow core mandrel at a rate of at least 0.7 sheet spacer channels per centimeter of mandrel circumference by means which does not occlude permeate communication with hollow core of the semi-permeable membrane sheet substantially coextensive with the major surfaces of each permeate fluid spacer sealed at the axial edges, radially proximal edge and radially distal edge, so as to enclose each major surface, the axial edges and the radially distal edge of each permeate sheet spacer channel within a membrane a plurality of discontinuous feed fluid spacers interspersed between membrane envelopes for axial flow of feed fluid.

The present invention also comprises a method of affixing permeate channel spacer sheets to the hollow core polymeric mandrels by ultrasonic welding means permitting attachment of a significantly larger number of permeate channels to the hollow core polymeric mandrel that has been heretofore disclosed.

Customarily, the hollow core polymeric mandrel of a spiral wound membrane element has a diameter of from about 1.2 to about 6.5 cm, more common are mandrels having an outside diameter of 2.5 to 5 cm. According to the present method, permeate channel spacer sheets may be attached at a rate of at least 0.7 per centimeter of circumference. Where necessary to achieve optimum membrane radial flow parameters, attachment rates of nine per centimeter of circumference are possible. Seven attachments per centimeter is a more workable attachment rate. Preferred membrane envelope length is frequently possible with membrane element designs having between about one and five membrane envelopes per centimeter of mandrel circumference. Between two and three attachments per centimeter of mandrel circumference is typical. Table I illustrates calculated numbers of permeate channel sheet attachments for mandrels of typical outside diameter.

TABLE I

| Mandrel Outside Diameter (cm) | Mandrel Outside Circumference | Attachments per (cm) | | | | | |
|---|---|---|---|---|---|---|---|
| | | 0.7 | 1 | 2.5 | 5 | 7 | 9 |
| | | Attachments per Mandrel | | | | | |
| 1.75 | 5.5 | 4 | 5 | | 27 | | 49 |
| 2.5 | 8 | 5 | 8 | | 40 | | 72 |
| 3.9 | 12 | | | 30 | | | |
| 5 | 15.7 | 11 | 16 | | | 102 | 204 |

Increasing the number of membrane envelopes beyond a number necessary to reduce the pressure loss of the permeate fluid channel to a point below which it is does not limit the efficiency of the membrane element produces no practical benefit. Consequently, the number of membrane leaves will generally not exceed 75 leaves per element, more frequently the number of leaves will not exceed 60 per element.

Spiral wound membrane elements according to the present invention frequently have eight or more membrane leaves. Each membrane leaf is characterized by a permeate flow channel attached to the central mandrel, a feed flow channel, and a membrane envelope enclosing the permeate channel, except at the central mandrel.

Flow channels are porous sheets known to the membrane filtration art, particularly in the field of reverse osmosis, ultrafiltration microfiltration, nanofiltration, and gas separation art to provide a solid but porous conduit for permeate fluid flow and to promote turbulence in a fluid stream flowing within a confined channel. Flow channels also serve to preserve the space between membrane sheets to prevent collapse of the membrane leaves on one another thus occluding fluid flow. The permeate flow channel conventionally comprises a tricot material described as a woven polyester fabric coated with epoxy, melamine, or similar thermoset resin. The steps of impregnating the fabric with a thermosetting resin and cross-linking the resin contributes to the compressive strength of the fabric while in use by permitting the permeate flow channel to tolerate the pressure applied to the membrane without collapse or undue creep. The permeate flow channels may have a thickness from 0.25 to 2.5 mm.

Feed flow channels frequently comprise polymeric grids having thicknesses comparable to permeate grids, 0.25 to 2.5 mm. The feed fluid flow channel may have a more open weave, if woven, or larger apertures if unwoven, than the permeate flow channel because the compressive support required by the permeate flow channel is not required of the feed flow channel. Extruded grid netting marketed by DuPont under the trademark Vexar is a suitable feed channel. Grid openings of Vexar brand netting from 1 mm to 6 mm are suitable. The end use environment will influence the material of construction of the extruded grid. Polyolefin polymers are generally suitable for a wide variety of end uses including water purification.

Within a functional membrane element the permeate flow channels are enclosed within a fluid-tight envelope formed on the major surfaces of semi-permeable membrane material. Referring to FIG. 1, the membrane envelope is formed by sealing the membrane at its axial edges by a suitable sealing means. In one embodiment, a continuous membrane sheet 34a may be folded 48 at both the radially distal end and at the radially proximal 46 end of the membrane envelope. In this embodiment the continuous membrane sheet is sealed to itself after encircling each permeate flow channel sheets.

In another embodiment, discontinuous membrane sheets may be used. Discontinuous membrane sheets may be folded, at the radially distal end, or the radially proximal end, to form two surfaces of a membrane envelope. The discontinuous membrane sheets are then joined by sealing means to continuously enclose the permeate flow channels within the semi-permeable membrane.

In still another embodiment, discontinuous membrane sheets may be unfolded. In this embodiment, the membrane sheets are joined at both the distal end 42 and the proximal end 44 to form a continuous membrane envelope.

Suitable sealing means conveniently employed to join of membrane sheets includes a synthetic resin such as epoxy resin or urethane resin, or a similar material having a period of several minutes before the material becomes intractable. The time required for such glue to harden does not interfere with the formation of the membrane envelope. The membrane envelopes are rolled into a spiral wound element while the glue is pliable. Adherent strength of the glue is not necessary in the element rolling phase in contrast to the attachment of permeate fluid spacers sheets to the mandrel. Upon hardening, the glue and membrane envelope is in its final shape.

In yet another embodiment of the invention, the permeate flow channel may be a substantially continuous sheet attached to the polymeric mandrel at a plurality of intervals along the length of the permeate flow channel. In such an embodiment the permeate flow channel will be double thickness within each membrane envelope and folded at the radially distal end of each envelope and also folded at the attachment to the mandrel.

The porosity of the mandrel of a preferred embodiment of the invention serves as a means of exit of the permeate fluid from the permeate flow channel. The mandrel may be of a porous material such as a sintered polymer. More often, the mandrel is an otherwise non-porous material which has been rendered porous by providing apertures therein as by drilling one or more holes radially in the mandrel. The polymeric material comprising the mandrel of a preferred embodiment of the invention is a thermoplastic.

Thermoplastics suitable as materials for hollow bore mandrels include polyethylene, polymethylpentene, polyphenylene sulfide, polypropylene, cellulosics, and acetal. Also suitable are the polymers of acrylonitrile-butadiene-styrene (ABS), ABS-polycarbonate alloys, polymers of butadiene-styrene, polyetherimide, polystyrene, polyvinylchloride, polysulfone, and poly(phenylene oxide).

Membranes suitable for use in membrane elements according to the instant invention are generally characterized as flat sheet membranes. Such membranes are useful for microfiltration, ultrafiltration, nanofiltration, and reverse osmosis. Typical membranes are reverse osmosis membranes are described in U.S. Pat. Nos. 4,277,344. Typical microfiltration membranes suitable for use in this invention are disclosed in said patent as the support for the composite membrane discriminating layer. Typical membranes suitable for separation of gas mixtures such as air, helium/methane, oxygen/nitrogen, unsaturated hydrocarbon/saturated hydrocarbon are described in U.S. Pat. No. 4,230,463.

As has been noted, the instant invention provides a membrane element having a large number of permeate flow channels attached to the central mandrel at regular intervals about the circumference of the central mandrel. The permeate flow channels are advantageously attached to the central mandrel by ultrasonic welding.

Ultrasonic welding is a means of welding thermoplastic articles by applying high frequency vibrations to the thermoplastic articles. Intermolecular friction and surface friction induced by the vibrations produce a sharp rise in temperature at the interface between the thermoplastic articles. When sufficient temperature is reached, the fluid state of the polymer and the applied pressure of the ultrasonic welding heads causes the polymer of the two thermoplastic articles to "flow." After the thermoplastic polymer of the articles flows together, the high frequency vibrations are halted. As the localized temperature falls, the thermoplastic solidifies into a unified part under the pressure applied by the ultrasonic welding heads. The "hold" time for which pressure is applied after the vibratory energy is halted may vary from 0.1 to 5 sec. The ultrasonic welding head may be called a "horn" in some ultrasonic literature. The welding head is usually selected or designed for each application. The welding head usually includes a horn having a length equal to one half-wave the length of the applied ultrasonic frequency.

Permeate flow channels may be affixed to the polymeric hollow core mandrel with reasonable precision by means of a jig which prevents the mandrel from rotating while the a major surface of a sheet of permeate feed channel is "welded" to the mandrel near an edge thereof. The mandrel may then be rotated a distance along the circumference of the mandrel corresponding to the circumference divided by the number of leaves to be attached to the element at which point the next permeate feed channel is "welded" to the feed channel and the rotation repeated.

The weldability of a thermoplastic resin is influenced by various factors including, but not limited to, the polymer structure, the melt temperature, the modulus of elasticity and chemical composition. Amorphous resins transmit sonic vibrations efficiently and lend themselves to ultrasonic welding over a wide range of ultrasonic wave amplitude. The melt temperature of the polymer impacts weldability of the articles to be welded have materially dissimilar melt temperatures. The lower melt temperature thermoplastic will melt and flow from the article interface removing heat energy as it flows away from the intended weld site precluding the build-up of sufficient temperature to melt the higher melting polymer to melt.

Semi-crystalline thermoplastics are said to absorb ultrasonic vibrations. As a result, in semi-crystalline thermoplastics vibrational energy does not readily transmit to the joint interface. High amplitude ultrasonic energy is required to generate sufficient heat energy to provide sufficient energy to melt semi-crystalline polymers. When the molten state is attained, a semi-crystalline polymer rapidly solidifies as it flows from the zone where ultrasonic energy is applied.

Thermoset resins are not suited to ultrasonic welding because the cross-linked polymers cannot be melted, even in a localized region, by ultrasonic energy. The permeate fluid channel advantageously employed in the present invention comprise porous fabric impregnated with a cross-linked thermoset resin. Thus, even if the fiber forming the fabric of the permeate flow channel is a thermoplastic, the fabric does not lend itself to welding by application of ultrasonic energy because the fibers are encapsulated by a crosslinked resin. However, it has been found that the permeate flow channel may be adhered to the thermoplastic mandrel by application of ultrasonic energy which does not result in welding in the traditional sense, i.e., that polymer of articles to be joined does not flow together.

Application of appropriate ultrasonic energy to a thermoplastic mandrel having a porous fabric placed between between the source of ultrasonic energy and the thermoplastic mandrel results in the anticipated liquification of the thermoplastic in the zone immediately adjacent to the source of ultrasonic energy. The pressure of the ultrasonic welding head applied to the porous fabric forces the fabric into the molten thermoplastic. The molten thermoplastic penetrates into the spaces between fibers and around fibers of the porous fabric. The pressure of ultrasonic head is continued for a short time after the ultrasonic energy is discontinued to permit the thermoplastic to solidify. The porous fabric forming the permeate flow channel thus becomes attached to the thermoplastic mandrel not by a welding process whereby the polymer of the mandrel and the polymer of the fabric flow together in the traditional sense, but rather by mechanically embedding molten thermoplastic into a porous fabric having a thermoset surface and thermoset behavior. The thermoplastic of the mandrel is thus at a minimum mechanically interlocked with, and possibly adhered to, the thermoset surfaced fabric.

It will be understood that in the region of the polymeric mandrel wherein a pore exists for permeate communication between the permeate flow channel and the central bore of the polymeric mandrel there exists no polymer to be melted by the application of ultrasonic energy. Consequently, melted thermoplastic polymer is not present to penetrate into the pore volume of the permeate flow channel. It will be further understood that a small amount of polymer melt may migrate from the perimeter of the pore of the mandrel into the area of the permeate flow channel represented by the pore of the mandrel extended radially into the permeate channel. However when the ultrasonic energy applied to melt the polymer of the mandrel is properly measured the migration of melt polymer into that portion of the permeate channel represented by the are of the mandrel pore, extended radially, does not materially occlude fluid communication between the permeate flow channel and the central bore of the hollow mandrel.

The resulting "weld" is advantageously oriented lengthwise along the axis of the mandrel. The width of an effective weld may be from about 0.2 to 5 mm. Customarily the welds is from 0.5 to 3 mm wide. The length of each weld may vary from a 0.5 cm to 15 cm. The length of the individual weld will be in large part determined by the geometry of the ultrasonic welding head. A plurality of welding heads may be utilized to provide sufficient mechanical strength to fix the fluid permeate channel to the mandrel during the assembly of the membrane element and module.

During the ultrasonic welding process each welding head is pressed against the permeate channel. The permeate channel is in contact with the mandrel and separates the thermoplastic mandrel from the welding head. Generally, pressure applied to the welding head may vary from 10 to 75 psi (69 to 520 kPa) for thermoplastics generally used, however, a lesser or greater pressure may be necessary if the thermoplastic on melting has a comparatively low or high melt viscosity.

The ultrasonic energy applied to the welding head for times from 0.1 to 2 seconds are generally sufficient to melt sufficient thermoplastic to form an adequate weld. The total energy necessary to apply to the welding head will be influenced by the polymer, polymer structure the molecular weight, the melt viscosity and similar factors. The amplitude of the ultrasonic vibration also impacts the total energy applied to the welding head. Commercial ultrasonic welding heads having an amplitude range from 0.1 to 3 mills (2.5 to 76 μm) serve well for welding the permeate channel to the mandrel. Amplitudes from 0.8 to 2 mills (20 to 51 μm) are preferred. Commercial ultrasonic welding heads operating at a frequency between 10 kHz and 50 kHz are operable to weld permeate channel to the mandrels.

The location of the welds along the length of the permeate fluid channel as it interfaces with the mandrel and the fraction of the interface length welded may be influenced by a variety of factors including the weld width, the mechanical strength of the thermoplastic polymer of the mandrel, the handling characteristics of the permeate flow channel including the tendency of the permeate flow channel to fold or kink. Typically, the the interface of the permeate flow channel is welded to the mandrel from 5 to 40 percent of the interface length.

The roundness of the membrane element after the membrane leaves have been rolled about the mandrel is advantageously controllable within a narrow range. Membrane elements prepared as described herein advantageously have a variation of outside diameter of not more than two percent from the mean value of the diameter, preferably the variation is less than one percent from the mean value of the diameter, most preferred is a variation not greater than 0.75 percent from the mean of the diameter. The variation of diameter considered excludes the that part of the membrane element at the axial ends where the diameter is influenced by the means used to seal the membrane leaves. Measurement of the diameter is accomplished by known methods such as by calipers at reasonable intervals, such intervals from 2.5 to 10 cm, parallel to the mandrel and at at least two angular rotations of the cylinder. By angular rotations of the cylinder is meant that the calipers are applied to the element along lines which would be formed by the intersection with the circumference of a plane parallel to, and intersecting the axis of the cylinder. The diameter is generally measured at at least two regular angular rotations about the axis.

It will be apparent that the time necessary to attach a permeate flow channel to a mandrel is greatly reduced by the means here described over attachment by use of a glue such as epoxy which requires a comparatively substantial time to react or "set".

Various modifications and changes will be apparent from the foregoing description of a spiral wound membrane element to those skilled in the art. Such modifications are considered with in the scope of the invention defined by the appended claims.

The invention is illustrated by the following examples but not limited by them.

EXAMPLE 1

Thirty permeate flow channels of tricot impregnated with crosslinked epoxy resin were welded to a porous mandrel of acetal thermoplastic having a length of 110 cm a circumference of 12 cm. Rectangular permeate flow sheets having dimensions of 90 cm by 75 cm were spaced regularly about the circumference of the mandrel. A long edge of the permeate sheets placed proximal to the mandrel was contacted by three ultrasonic welding horns having a length of 7.5 cm and a width of 0.75 mm spaced regularly along the length of the mandrel. The welding horns apply a pressure of 50 psi (345 kPa) to the permeate channel clamping the permeate channel in place between the mandrel and the welding horns during the welding operation. The pressure applied is sufficient to cause the permeate channel to penetrate into localized melted polymer. Ultrasonic energy was applied to the welding horns at a frequency of 20 kHz and a displacement amplitude of 1.6 mil (40 μm). The ultrasonic energy is applied to the mandrel for 0.5 seconds.

A folded sheet of continuous polyamide composite reverse osmosis membrane prepared according to the teachings of U.S. Pat. No. 4,277,344 of a width of 90 cm was inserted between each permeate flow channel having fold lengths of 75 cm. The permeate flow channel was sealed in the membrane sheet along each each axial end by a two-part urethane glue applied to the permeate side of one membrane sheet. The two ends of the continuous membrane sheet were joined by application of the two-part urethane glue. The 30 membrane leaves were then rolled about the mandrel and the membrane leaves held in place by the application of pressure sensitive tape about the circumference. The resulting membrane element a high degree of uniformity, e.g, the diameter varied from 19.1 to 19.6 cm. When the urethane glue was set, the urethane glue sealed the axial ends of an envelope enclosing the permeate channel, except at the edge thereof proximal to the mandrel.

EXAMPLE 2

Sixty sheets of permeate flow channel are ultrasonicly welded to a mandrel having a circumference of 12 cm as in Example 1. Membrane of microporous polypropylene membrane of a type designated Celgard™, manufactured by Celanese Chemical Company, is enclosed in membrane envelopes. Membrane envelopes are prepared by sealing the axial ends of the permeate side of the continuous membrane with two-part urethane glue. When rolled about the mandrel the resulting membrane element shows a high degree of uniformity, i.e., the diameter shows a variation less than 5 percent about the circumference at a given axial location.

EXAMPLE 3

Forty sheets of permeate flow channel having an axial length of 25 cm and a radial length of 20 cm are ultrasonicly welded to a mandrel having a circumference of 5.5 cm. Two ultrasonic welding horns having dimensions as in Example 1 are regularly space axially along the mandrel. Membrane envelopes are prepared as in Example 1. The resulting spiral wound membrane element shows a variation of less than two percent about the circumference at a given axial location.

EXAMPLE 4

Ninety sheets of permeate flow channel according to Example 1 are ultrasonicly welded to a mandrel having a circumference of 15.7 cm as described by Example 1. Membrane envelopes are prepared by sealing the axial ends. When rolled about the mandrel the resulting spiral wound membrane element shows a variation of diameter of less than one and one-half percent from the mean value along the axial length of the membrane element, except in the region of the axial ends of the element where the membrane envelope is sealed by two-part urethane glue.

EXAMPLE 5

One hundred sheets of permeate flow channel according to Example 1 are ultrasonicly welded to a mandrel having a circumference of 12 cm as described by Example 1. Membrane comprising microporous polysulfone prepared from a 15 weight percent solution of polysulfone resin dissolved in dimethyl formamide extruded into a water bath to coagulate the polysulfone. Membrane envelopes are prepared by sealing the axial ends. When rolled about the mandrel the resulting spiral wound membrane element shows a variation of less than 1.5 percent from the mean diameter. At the axial ends the variation is less than 5 percent from the mean diameter determined distal from the axial ends.

EXAMPLE 6

A membrane element according to Example 3 is inserted into a pressure tight cylindrical container with appropriate sealing means having a feed fluid inlet, a permeate fluid outlet, and a non-permeate fluid outlet. Synthetic sea water under pressure is fed to the feed fluid inlet connection. Desalinated water is recovered from the permeate outlet.

EXAMPLE 7

A membrane element is fitted in a pressure tight cylindrical enclosure according to Example 6, except the membrane material is prepared according to U.S. Pat. No. 4,230,463, Example 23: a microporous polysulfone sheet having a post-vulcanized silicone rubber coating thereon. Air is used as a feed fluid. The separation caused the non-permeate fluid to have a concentration of nitrogen of 55 percent and oxygen in the non-permeate fluid of 44 percent.

I claim:

1. A spiral wound semi-permeable membrane element for axial feed fluid path comprising:
   a. a porous hollow core mandrel,
   b. a plurality of discontinuous permeate sheet spacer channels affixed to the hollow core mandrel at a rate of at least 0.7 sheet spacer channels per centimeter of mandrel circumference by ultrasonic welding,
   c. semi-permeable membrane sheet substantially coextensive with the major surfaces of each permeate fluid spacer sealed at the axial edges, radially proximal edge and radially distal edge, so as to enclose each major surface, the axial edges and the radially distal edge of each permeate sheet spacer channel within a membrane envelope,
   d. a plurality of discontinuous feed fluid spacers interspersed between membrane envelopes for axial flow of feed fluid.

2. The spiral wound membrane element of claim 1 having the membrane envelopes and channel spacers wound about the mandrel and enclosed within a pressure tight cylindrical enclosure having fluid connections for feed fluid inlet, at least one connection for non-permeate fluid outlet, and at least one connection for permeate fluid outlet.

3. The spiral wound semi-permeable membrane element according to claim 1 wherein the spacer channels are affixed to the hollow core mandrel at a rate of at least one attachment per centimeter.

4. The spiral wound semi-permeable membrane element according to claim 1 wherein the spacer channels are affixed to the hollow core mandrel at a rate of at least two attachments per centimeter.

5. The spiral wound semi-permeable membrane element according to claim 1 where the semi-permeable membrane envelope comprises membrane sheets which are substantially coextensive with one major surface of permeate flow channel spacer.

6. The spiral wound semi-permeable membrane element according to claim 1 where the semi-permeable membrane envelope comprises membrane sheets which are substantially coextensive with two major surfaces of the same permeate flow channel spacer, or substantially coextensive with a major surface of two adjacent permeate flow channel spacers.

7. The spiral wound semi-permeable membrane element according to claim 1 where the semi-permeable membrane envelope comprises a single membrane sheet accordion folded and substantially coextensive with all major surfaces of permeate flow channel having the ends of the membrane sheet joined and sealed to form a continuous sheet.

8. The spiral wound semi-permeable membrane element according to claims 1, 3, 4, 5, 6, or 7 wherein the porous hollow core mandrel consists of polyethylene, polymethylpentene, polyphenylene sulfide, polypropylene, cellusosic polymers, acetal, acrylonitrile-butadienestyrene (ABS), ABS-polycarbonate alloys, polystyrene, polystyrene-butadiene, polyethermide, polyvinyl chloride, polysulfone, or poly(phenylene oxide).

9. A method of separating fluid constituents by forcing a fluid under pressure into a feed fluid inlet of pressure tight cylindrical enclosure according to claim 2 and collecting non-permeate fluid and permeate fluid.

10. The method of claim 9 where the fluid is water containing salt.

11. The method of claim 9 where the fluid to be separated is selected from the gas mixtures air, helium/methane, oxygen/nitrogen, unsaturated hydrocarbon/saturated hydrocarbon.

* * * * *